United States Patent [19]

Oortwijn et al.

[11] Patent Number: 5,803,724
[45] Date of Patent: Sep. 8, 1998

[54] METHOD FOR FLAME STABILIZATION IN A PROCESS FOR PREPARING SYNTHESIS GAS

[75] Inventors: Peter Oortwijn, The Hague; Hendrik Martinus Wentinck, Amsterdam, both of Netherlands

[73] Assignee: Shell Oil Company, Houston, Tex.

[21] Appl. No.: 657,574

[22] Filed: Jun. 4, 1996

[30] Foreign Application Priority Data

Jun. 6, 1995 [EP] European Pat. Off. .............. 95201487

[51] Int. Cl.$^6$ ....................................................... F23J 7/00
[52] U.S. Cl. ................... 431/4; 431/12; 431/75; 431/10; 431/177
[58] Field of Search .................... 431/4, 12, 75, 431/177, 10; 110/347

[56] References Cited

U.S. PATENT DOCUMENTS

| | | | |
|---|---|---|---|
| 4,505,665 | 3/1985 | Mansour | 431/10 |
| 4,618,323 | 10/1986 | Mansour | 431/177 |
| 4,789,384 | 12/1988 | Martens et al. | 48/197 |
| 4,836,831 | 6/1989 | Martens | 48/197 |
| 4,878,835 | 11/1989 | Martens | 431/187 |
| 4,960,059 | 10/1990 | Berkau et al. | 110/347 |
| 4,993,222 | 2/1991 | Iwai et al. | 60/39.06 |
| 5,458,808 | 10/1995 | Suggitt et al. | |

FOREIGN PATENT DOCUMENTS

| | | |
|---|---|---|
| 0082634 A1 | 6/1983 | European Pat. Off. . |
| 0482373 A2 | 5/1991 | European Pat. Off. . |

OTHER PUBLICATIONS

Search Report dated Oct. 29, 1996.
Christensen, T.S. and Primdahl, I.I., "Improve Syngas Production Using Autothermal Reforming", *Hydrocarbon Processing,* Mar. 1994, pp. 39–46.

*Primary Examiner*—Larry Jones

[57] ABSTRACT

A method is presented for stabilizing the flame on the tips of burner internals in a process for preparing synthesis gas by partial oxidation of a gaseous hydrocarbon-containing fuel. The method comprises supplying a gaseous hydrocarbon-containing fuel, a moderator gas and an oxidizer through a burner to a reactor, and adjusting the mass flow of the moderator gas such that the moderator gas concentration does not exceed a predetermined limit. The process conditions are effected such that the flame contacts the burner internal tips. In case of flame-lifting from the burner internal tips, the velocities and mass flows of the fuel and/or oxidizer and/or moderator gas are re-adjusted in such a manner that the flame is restabilized on the burner internal tips.

15 Claims, No Drawings

METHOD FOR FLAME STABILIZATION IN A PROCESS FOR PREPARING SYNTHESIS GAS

BACKGROUND OF THE INVENTION

The present invention relates to a method for flame stabilization in a process for preparing synthesis gas by partial oxidation of a gaseous hydrocarbon-containing fuel and an oxygen-containing gas.

Synthesis gas is a gas comprising carbon monoxide and hydrogen, and it is used, for example, as a clean medium-calorific value fuel gas or as a feedstock for the synthesis of methanol, ammonia or hydrocarbons, which latter synthesis yields gaseous hydrocarbons and liquid hydrocarbons such as gasoline, middle distillates, lube oils and waxes.

In the specification and in the claims the term "gaseous hydrocarbon-containing fuel" will be used to refer to hydrocarbon-containing fuel that is gaseous at gasifier feed pressure and temperature.

According to an established process, synthesis gas is produced by partially oxidizing in a reactor vessel a gaseous fuel such as gaseous hydrocarbon, in particular petroleum gas or natural gas, at a temperature in the range of from about 1000° C. to about 1800° C. and at a pressure in the range of from about 0.1 MPa to about 12 MPa absolute with the use of an oxygen-containing gas.

Synthesis gas will often be produced near or at a crude oil refinery because the produced synthesis gas can be directly applied as a feedstock for the production of middle distillates, ammonia, hydrogen, methanol or as a fuel gas. The fuel gas will then be used, for example, for heating the furnaces of the refinery or, more efficiently, for firing gas turbines to produce electricity and heat.

Gas burners applied in partial oxidation processes for preparing synthesis gas have traditionally had burner lifetimes restricted by the phenomena of retraction of the tips due to high temperature carburization and oxidation. Because of such phenomena serious burner damage will occur and the on-stream time of the reactor will be limited.

Therefore, there is a need for new burners having a long lifetime which are less sensitive to the above phenomena than existing burners. A burner design has already been proposed wherein the overall flow and mixing pattern of the reactants ensures that no burner parts come in contact with hot gases from the combustion zone. This burner is capable of operating at high flame temperatures without burner-wear problems. (See, T. S. Christensen and I. I. Primdahl, "Improve Syngas Production Using Autothermal Reforming," Hydrocarbon Processing, March 1994, p. 42). However, if the flame is lifted from the burner a product gas mixture of undesirable changing composition and changing temperatures in the reactor could result. Also, noise (levels greater than 120 dB) and strong mechanical vibrations of the burner and gasifier may occur. Such vibrations can be harmful to the refractory lining of the reactor.

It has now been found that the burner performance is influenced advantageously by flame stabilization and therefore care should be taken to stabilize the flame on the burner tips.

It is an object of the invention to provide a method for flame stabilization on the burner tips which solves the above problems.

SUMMARY OF THE INVENTION

In a process for preparing synthesis gas, an oxygen-containing gas, applied as an oxidizer, and a gaseous hydrocarbon-containing fuel are supplied to a gasification zone through a burner, e.g., a multi-orifice (co-annular) burner comprising a concentric arrangement of n passages or channels coaxial with the longitudinal axis of the burner, wherein n is an integer greater than 2, and wherein autothermically a gaseous stream containing synthesis gas is produced under appropriate conditions.

DETAILED DESCRIPTION

In a process for preparing synthesis gas, an oxygen-containing gas, applied as an oxidizer, and a gaseous hydrocarbon-containing fuel are supplied to a gasification zone through a burner. A preferred burner is multi-orificed (co-annular) and comprises a concentric arrangement of n passages or channels coaxial with the longitudinal axis of the burner, wherein n is an integer greater than 2, and wherein autothermically a gaseous stream containing synthesis gas is produced under appropriate conditions. Such co-annular burners contain substantially cylindrical internals which separate the oxidizer and the hydrocarbon-containing fuel until they reach the burner exit. A channel carrying fuel is known as a "fuel channel," a channel containing oxidizer is known as an "oxidizer channel," etc.

The oxygen-containing gas, which is applied as an oxidizer, is usually air or (pure) oxygen or steam or a mixture thereof. In order to control the temperature in the gasification zone a moderator gas (for example steam, water, carbon dioxide, or a combination thereof) can be supplied to the zone. The moderator gas can be supplied through the fuel channel, the oxidizer channel or a separate channel of the burner. Those skilled in the art will know the conditions of applying oxidizer and moderator gas.

The process of the invention has been found to stabilize the flame on the tips of burner internals for burners used in preparing synthesis gas by partial oxidation of a gaseous hydrocarbon-containing fuel. The process comprises the steps of:

a) supplying a gaseous hydrocarbon-containing fuel, a moderator gas and an oxidizer through a burner to a reactor, wherein the mass flow of the moderator gas is adjusted such that the moderator gas concentration does not exceed a predetermined limit;

b) effecting process conditions such that the flame is contacting the burner internal tips; and c) re-adjusting the velocities and mass flows of the fuel and/or oxidizer and/or moderator gas in case of flame-lifting from the burner internal tips in such a manner that the flame is restabilized on the burner internal tips, wherein during adjustment the moderator gas concentration does not exceed the predetermined limit of step a).

Those skilled in the art will know the general burner design conditions in which a flame contacts the burner tips.

The process described stabilizes the flame on the burner internal tips. By applying a low amount of moderator gas it is possible to prepare a CO-rich product gas with a relatively high $CO/H_2$ ratio, which is advantageous for downstream processes such as, e.g., the Shell Middle Distillates Process (SMDS). The burner internal tips are made of a suitable material which is able to withstand such a flame, e.g., ceramic materials (e.g., silicon carbide or silicon nitride), noble metals or alloys thereof (e.g., Pt and/or Rh).

Since the flame at the burner exit generates a sound, flame lifting from the burner internal tips can be observed by a change in noise level. Noise levels are monitored, e.g., by means of (piezo resistive) pressure transducers.

Another possible means to monitor flame lifting is by optical measurement. For example, an optical probe may be inserted into a burner channel, e.g. in the central channel of the burner. Flame lifting produces different flame spectra, which may be analyzed.

It has been found that by means of adjusting the moderator gas concentration, the flame position/stabilization with respect to the burner exit can be monitored at given process conditions such as throughput, pressure, temperature and the like. Flame monitoring/control is of particular importance when the feedstock is natural gas which is changing in composition or when recycled gas of varying composition is added to the natural gas feedstock.

Advantageously, moderator gas such as steam or $CO_2$ can be supplied. For example, in a burner with a channel width of 1–2 mm, a moderator gas may be supplied with a velocity of 3–10 m/s in a channel between the gaseous hydrocarbon-containing fuel and the oxidizer.

The invention is detailed in the following Examples A, B and C. For all three examples the feed was natural gas with the following typical composition:

$CH_4$: 94.4% by volume
$C_2H_6$: 3.0% by volume
$C_3H_8$: 0.5% by volume
$C_4H_{10}$: 0.2% by volume
$C_5H_{12+}$: 0.2% by volume
$CO_2$: 0.2% by volume
$N_2$: 1.5% by volume The supply temperature to the burner of the feedstock was 150°–400° C. The oxidizer was 99.5% pure $O_2$ with a supply temperature of 150°–300° C. The burner was operating in the flame stabilized mode at a typical reactor pressure of 2–7 MPa and a reactor/syngas temperature of 1200°–1500° C. The moderator gas was steam.

Example A represents a burner wherein the fuel velocity is higher than the oxidizer velocity (fuel blast burner). Examples B and C represent a burner wherein the oxidizer velocity is higher than the fuel velocity (oxygen blast burner).

| Number of passages: | | Example A 4 | Example B 3 | Example C 2 |
|---|---|---|---|---|
| Passage 1: | feed velocity | oxidizer 20–50 m/s | fuel 20–50 m/s | oxidizer 80–120 m/s (blast flow) |
| Passage 2: | feed velocity | fuel 50–100 m/s (blast flow) | oxidizer 80–120 m/s (blast flow) | fuel 20–50 m/s |
| Passage 3: | feed velocity | oxidizer 20 to 50 m/s | fuel 20–50 m/s | N/A N/A |
| Passage 4: | feed velocity | fuel 20–50 m/s | N/A N/A | N/A N/A |
| Velocity ratio between the blast flow and the other flows | | 2–4 | 2–4 | 2–4 |
| Steam (moderator) in oxidizer | | less than 30 vol % | less than 20 vol % | less than 20 vol % |

In cases where the natural gas feed also contains moderator gas, the maximum amount of moderator gas which can be added to the oxidizer should be reduced to ensure flame stabilization. In cases where the moderator gas also contains $CO_2$ or $N_2$, the maximum molar concentration of moderator gas in the oxidizer may be changed to ensure flame stabilization. These reductions or changes are in accordance with the changes in the laminar flame velocity of premixed stoichiometric mixtures of the oxidizer and the fuel, such as is known by those skilled in the art.

In cases where the moderator gas is not added to the oxidizer until the burner exit but is injected via the small channel or slit between the oxidizer channel and the fuel channel, the moderator gas may also contain CO, $H_2$ and hydrocarbons up to 20 vol % total. In this case the moderator gas typically flows through a slit of 1–2 mm wide at a typical velocity of 5–10 m/s.

It will be appreciated by those skilled in the art that any burner slit width suitable for the purpose can be applied, dependent on the burner capacity. Preferably, the first or central passage of the burner has a diameter up to about 70 mm, whereas the remaining concentric passages have slit widths in the range of about 1 mm to about 20 mm.

It has been found that when the velocity of the oxidizer is higher than the velocity of the fuel, the flame will lift from the burner internal tip if the moderator gas concentration in the oxidizer is more than about 20 vol %. When the fuel velocity is higher than the oxidizer velocity, it has been found that the flame will lift from the burner internal tip if the moderator gas concentration in the oxidizer is more than about 30 vol %.

Various modifications of the present invention will become apparent to those skilled in the art from the foregoing description. Such modifications are intended to fall within the scope of the appended claims.

What is claimed is:

1. A method for stabilizing a flame on tips of burner internals in a process for preparing synthesis gas by partial oxidation of a gaseous hydrocarbon-containing fuel comprising the steps of:
   a) supplying a gaseous hydrocarbon-containing fuel, a moderator gas and an oxidizer through a burner to a reactor, wherein each of said fuel, moderator gas and oxidizer is supplied at a velocity and mass flow, and wherein the mass flow of the moderator gas is adjusted such that the moderator gas concentration does not exceed a predetermined limit;
   b) effecting process conditions such that the flame is contacting the burner internal tips; and
   c) re-adjusting the velocity and mass flow of the fuel and/or oxidizer and/or moderator gas in case of flame-lifting from the burner internal tips in such a manner that the flame is restabilized on the burner internal tips, wherein the re-adjusted mass flow of the moderator gas does not cause the moderator gas concentration to exceed said predetermined limit of step a).

2. The method of claim 1, wherein the burner is a multi-orifice (co-annular) burner comprising a concentric arrangement of n passages or channels coaxial with a longitudinal axis of said burner, wherein n is an integer greater than 2.

3. The method of claim 2, wherein the moderator gas is passed through a channel or slit between a gaseous hydrocarbon-containing fuel channel and an oxidizer channel.

4. The method of claim 1, wherein the flame is monitored.

5. The method of claim 4, wherein the flame is monitored by noise detection.

6. The method of claim 5 wherein the noise detection comprises pressure transducers.

7. The method of claim 4, wherein the flame is monitored optically.

8. The method of claim 7, wherein the flame is monitored by an optical probe inserted in a burner channel.

9. The method of claim 8, wherein the optical probe is inserted in a central channel of the burner.

10. The method of claim 1 wherein the burner internal tips are made from a material selected from the group consisting of ceramics, noble metals, and alloys thereof.

11. The method of claim 1, wherein the moderator gas is supplied with the gaseous hydrocarbon-containing fuel.

12. The method of claim 1 wherein the moderator gas is supplied with the oxidizer.

13. The method of claim 1, wherein the moderator gas is selected from the group consisting of aqueous steam, carbon dioxide, and a combination thereof.

14. The method of claim 1, wherein the fuel velocity is higher than the oxidizer velocity and the mass flow of the moderator gas is adjusted such that the concentration of moderator gas in the oxidizer is less than about 30 vol %.

15. The method of claim 1, wherein the oxidizer velocity is higher than the fuel velocity and the mass flow of the moderator gas is adjusted such that the concentration of moderator gas in the oxidizer is less than about 20 vol %.

* * * * *